(12) United States Patent
Lomicka et al.

(10) Patent No.: US 7,669,611 B2
(45) Date of Patent: Mar. 2, 2010

(54) MOTORIZED FLUID CONTROL VALVE WITH SAFETY DEVICE

(76) Inventors: Joe Lomicka, 1770 Brackett St., La Verne, CA (US) 91750; Sean Odo, 1770 Brackett St., La Verne, CA (US) 91750

( * ) Notice: Subject to any disclaimer, the term of this patent is extended or adjusted under 35 U.S.C. 154(b) by 741 days.

(21) Appl. No.: 11/489,924

(22) Filed: Jul. 19, 2006

(65) Prior Publication Data

US 2007/0023721 A1 Feb. 1, 2007

Related U.S. Application Data

(60) Provisional application No. 60/700,849, filed on Jul. 19, 2005.

(51) Int. Cl.
*F16K 37/00* (2006.01)
*F16K 31/04* (2006.01)
(52) U.S. Cl. .................... 137/554; 137/556; 251/129.11
(58) Field of Classification Search .................. 137/553, 137/554, 556; 251/129.11
See application file for complete search history.

(56) References Cited

U.S. PATENT DOCUMENTS 4,375,789 A * 3/1983 Bergeron .................... 137/553
6,763,850 B1 * 7/2004 Jansen et al. ................ 137/554

* cited by examiner

*Primary Examiner*—Kevin L Lee
(74) *Attorney, Agent, or Firm*—Raymond Y. Chan; David and Raymond Patent Firm

(57) ABSTRACT

A motorized fluid control valve includes a valve unit having a fluid inlet and outlet provided in a tube for controlling fluid flow, wherein the valve unit is adapted to operate between an opened and closed position. The motorized fluid control valve includes a motor and a driving pin providing a rotational power, a cam including a cam body rotatably mounted in such a manner that the motor is arrange to drive the cam body to rotate to operate the valve unit and to produce a valve signal showing a corresponding position of the valve unit. The motorized fluid control valve includes a valve safety arrangement having two fingers. When the valve unit is stuck, the driving pin will break the two fingers to disengage the cam from the motor, thus stopping any further rotation of the cam and provide a true signal regarding the position of the valve unit.

1 Claim, 5 Drawing Sheets

MOTORIZED FLUID CONTROL VALVE WITH SAFETY DEVICE

CROSS-REFERENCES TO RELATED APPLICATIONS

This is a non-provisional application of a provisional application having an application 60/700,849 and a filing date of Jul. 19, 2005.

BACKGROUND OF THE PRESENT INVENTION

1. Field of Invention

The present invention relates to fluid control valves and more particularly to a motorized fluid control valve with safety device.

2. Description of Related Arts

On existing motorized valves, the weak point can be on the valve itself. If the valve gets stuck and breaks, the rest of the assembly can continue to move until a "closed" state is shown by the feed back device. This can be an extreme hazard and nuisance if the valve is still "open".

SUMMARY OF THE PRESENT INVENTION

A main object of the present invention is to provide a motorized fluid control valve with a safety feature which can always indicate the true position of the valve unit.

Another object of the present invention is to provide a mechanism for improving a motorized fluid control valve.

Accordingly, in order to accomplish the above objects, the present invention provides a motorized fluid control valve for controlling fluid flowing through a tube, comprising:

a valve unit which comprises a fluid inlet and a fluid outlet operatively provided in the tube for controlling a flow of the fluid in the tube at a predetermined flow rate, wherein the valve unit is adapted to operate between a closed position and an opened position, wherein in the closed position, the fluid inlet is driven to close for blocking the fluid flowing through the valve unit, wherein in the opened position, the fluid inlet is driven to open for allowing the fluid flowing through the fluid inlet and the fluid outlet at the predetermined flow rate;

a power unit, which comprises a motor and a driving pin rotatably extended from the motor for delivering a rotational power;

a cam which comprises a cam body rotatably mounted between the power unit and the valve unit, in such a manner that the power unit is arrange to drive the cam body to rotate for driving the valve unit moving between the closed position and the opened position, wherein the cam is adapted to produce a valve signal showing a corresponding position of the valve unit; and a valve safety arrangement, which comprises two fingers, which are spacedly apart from each other to define a driving slot between the two fingers, upwardly extended from the cam body, wherein the driving pin of the motor is extended to receive in the driving slot for normally driving the cam body to rotate so as to drive the valve unit to move between the closed position and the opened position, wherein when the valve unit is stuck in the tube, the driving pin is arranged to break the fingers for mechanically disconnecting the power unit with the cam body, so as to allow a correct valve signal being shown for truly reflecting a position of the valve unit in the tube.

These and other objectives, features, and advantages of the present invention will become apparent from the following detailed description, the accompanying drawings, and the appended claims.

DETAILED DESCRIPTION OF THE PREFERRED EMBODIMENT

Figure 1:
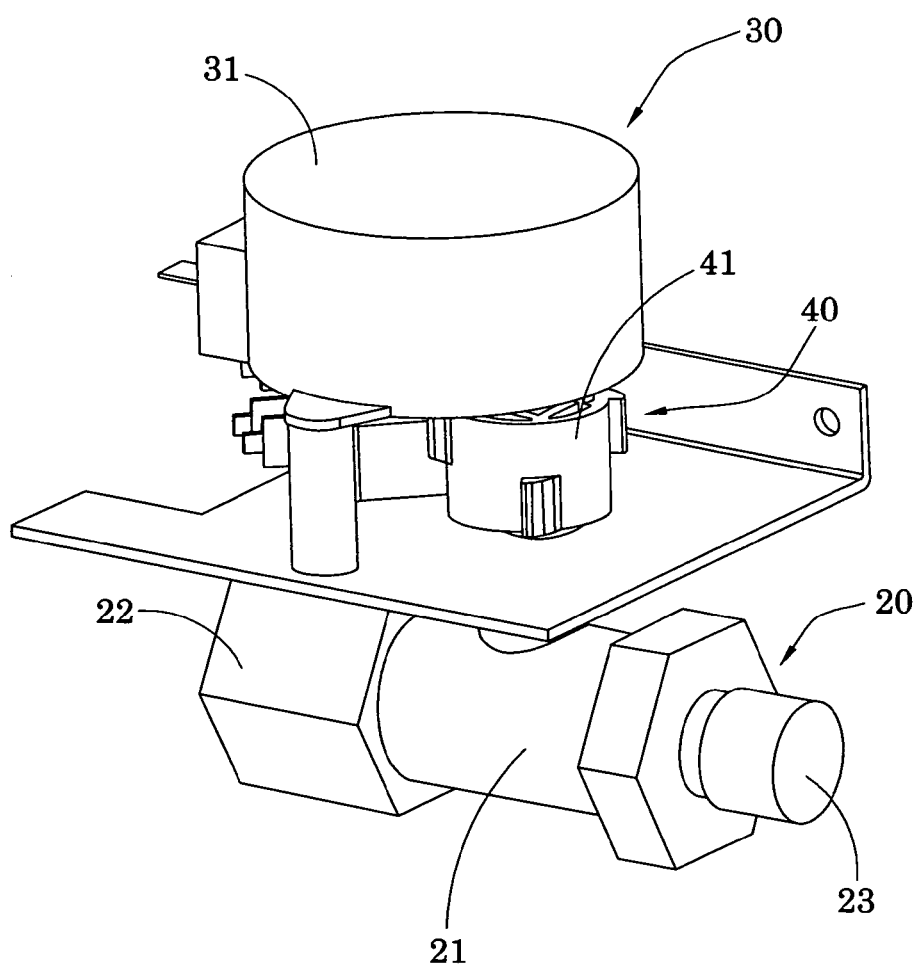
FIG. 1 is a perspective view of a motorized fluid control valve with safety device according to a preferred embodiment of the present invention.
Figure 2:
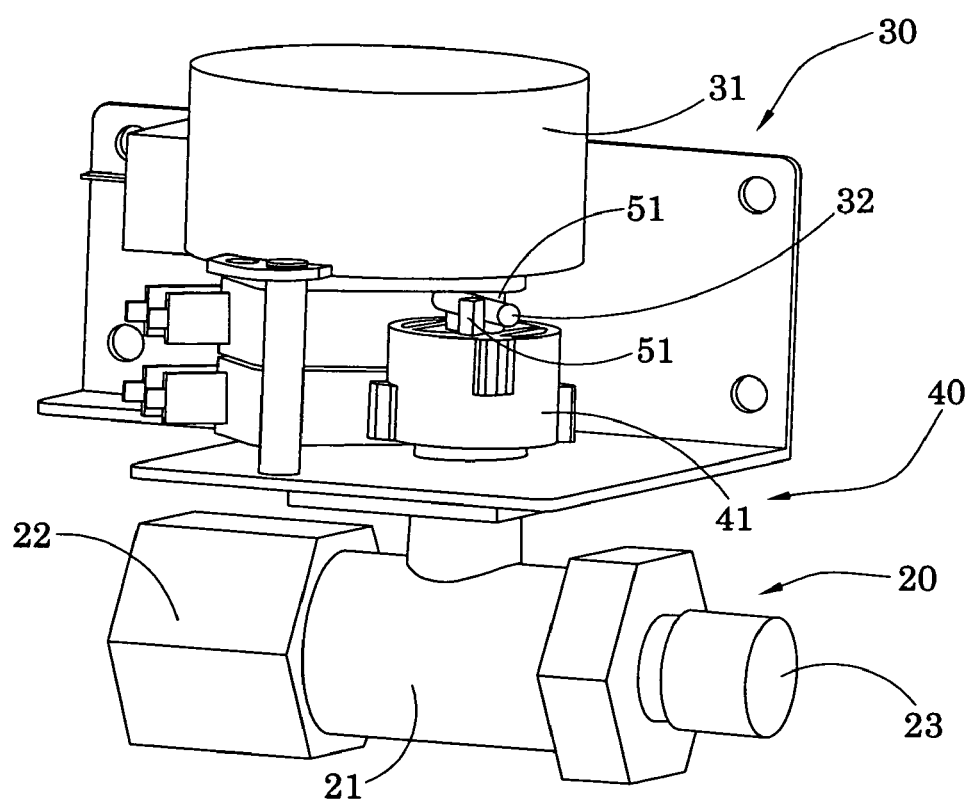
FIG. 2 is an alternate perspective view of a motorized fluid control valve according to the above preferred embodiment of the present invention.
Figure 3:
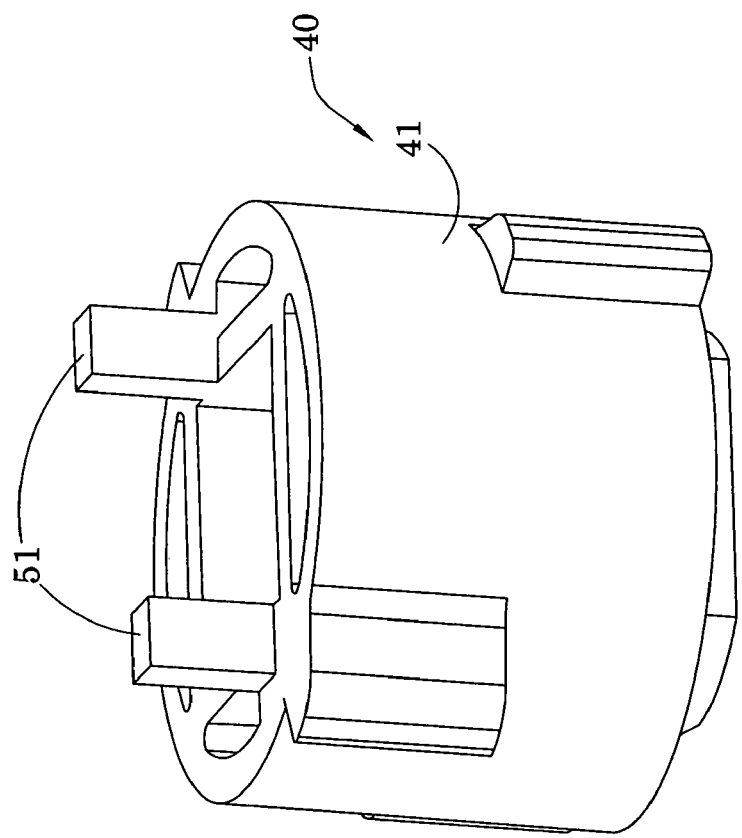
FIG. 3 is a drawing of a cam according to the above preferred embodiment of the present invention.
Figure 4:
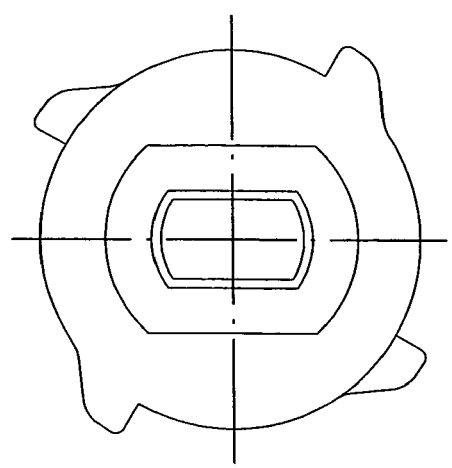
FIG. 4 is sectional views of a cam according to the above preferred embodiment of the present invention.
Figure 4:
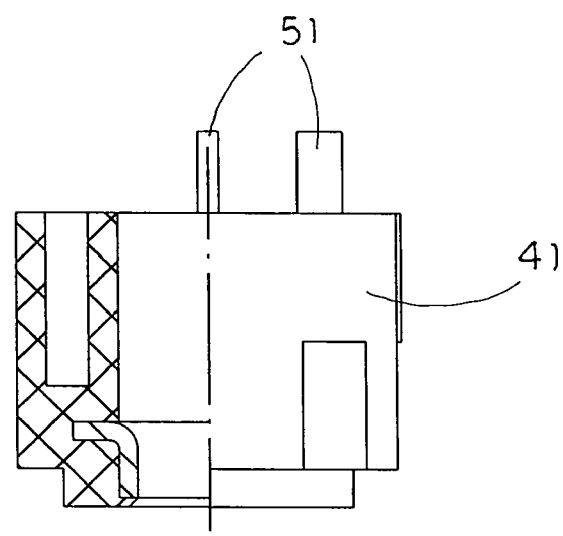
Figure 4:
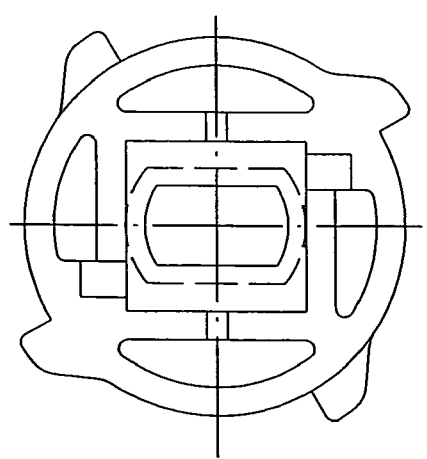
Figure 5:
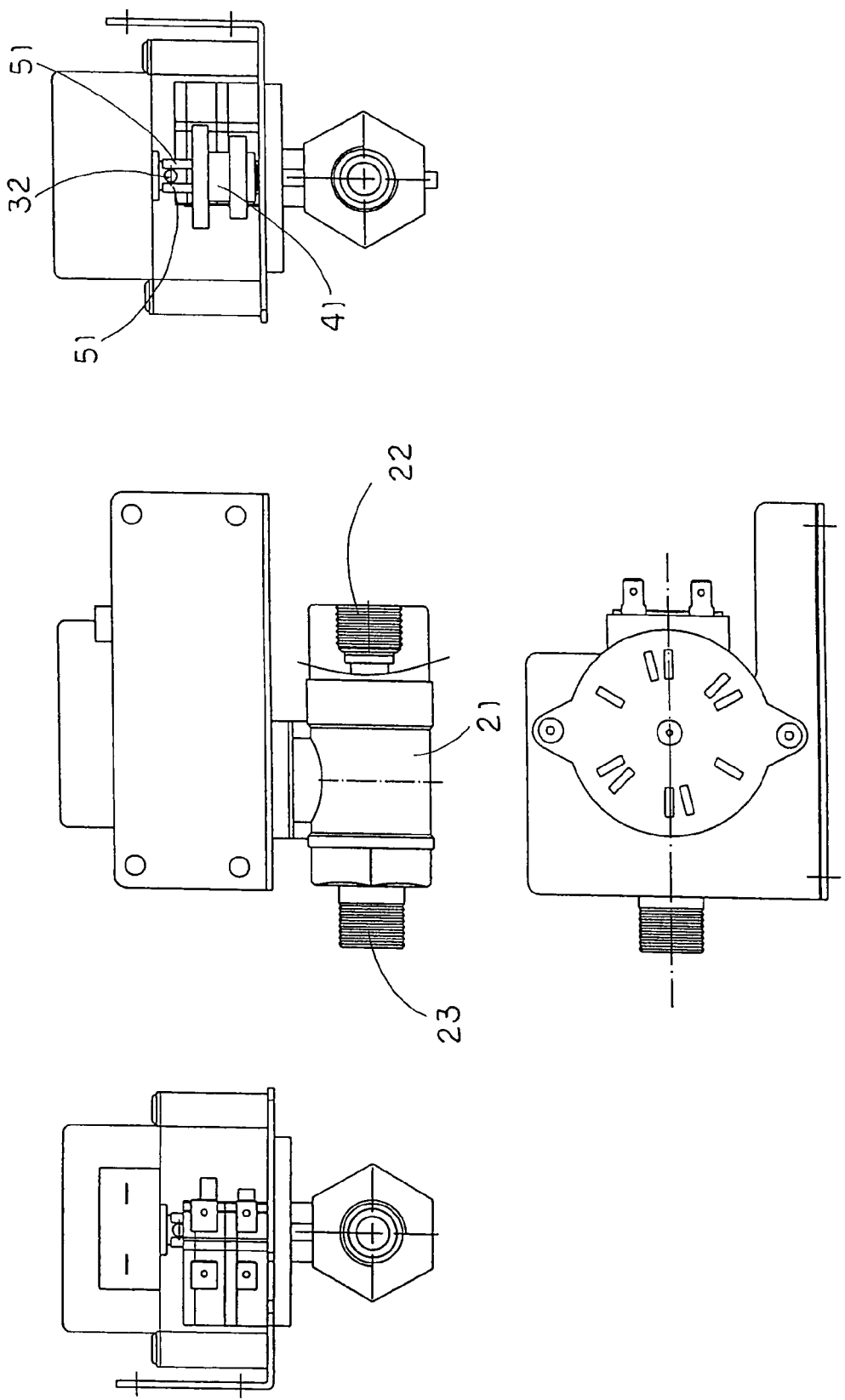
FIG. 5 is sectional views of a motorized fluid control valve according to the above preferred embodiment of the present invention.

Referring to FIGS. 1-5 of the drawings, a motorized fluid control valve for controlling fluid flowing through a tube 21 comprises a valve unit 20 which comprises a fluid inlet 22 and a fluid outlet 23 operatively provided in the tube 21 for controlling a flow of the fluid in the tube 21 at a predetermined flow rate. The valve unit 20 is adapted to operate between a closed position and an opened position, wherein in the closed position, the fluid inlet 22 is driven to close for blocking the fluid flowing through the valve unit 20. Wherein in the opened position, the fluid inlet 22 is driven to open for allowing the fluid flowing through the fluid inlet 22 and the fluid outlet 23 at the predetermined flow rate.

The motorized fluid control valve further comprises a power unit 30, which comprises a motor 31 and a driving pin 32 rotatably extended from the motor 31 for delivering a rotational power. The power unit 30 could be an electrical source providing electrical power to drive the motor 31.

The motorized fluid control valve further comprises a cam 40 which comprises a cam body 41 rotatably mounted between the power unit 30 and the valve unit 20, in such a manner that the power unit 30 is arranged to drive the cam body 41 to rotate for driving the valve unit 20 moving between the closed position and the opened position, wherein the cam is adapted to produce a valve signal showing a corresponding position of the valve unit 20.

The motorized fluid control valve further comprises a valve safety arrangement, which comprises two fingers 51, which are spacedly apart from each other to define a driving slot between the two fingers 51, upwardly extended from the cam body 41. The driving pin 32 of the motor 31 is extended to receive in the driving slot for normally driving the cam body 41 to rotate so as to drive the valve unit 20 to move between the closed position and the opened position. When the valve unit 20 is stuck in the tube 21, the driving pin 32 is arranged to break the fingers 51 for mechanically disconnecting the power unit 30 with the cam body 41. This process disengages the cam 40 and the valve unit 20 from the motor 31 so that when the valve is stuck, the motor 31 will not be able to rotate the cam 40 anymore and thus reflecting a false signal of the current position of the non-operating valve unit 20. This will, in turn, not allow the feedback device to be activated. Upon noticing an error in the functionality of the valve unit 20, a person can look at the cam 40 and see exactly what position the valve unit 20 is in and can ensure the system is safe. For example, if the valve unit 20 gets stuck in the open position, the motor will break the two fingers 51 and the cam 40 will never state that the valve is in the close position unless it truly is. If there was no safety arrangement such as this, when the valve unit 20 "froze", and a point between the cam 40 and the valve unit broke, the valve unit could be shown as closed when it is still open, thereby creating an unsafe or objectionable condition.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A motorized fluid control valve for controlling fluid flowing through a tube, comprising:

a valve unit which comprises a fluid inlet and a fluid outlet operatively provided in said tube for controlling a flow of said fluid in said tube at a predetermined flow rate, wherein said valve unit is adapted to operate between a closed position and an opened position, wherein in said closed position, said fluid inlet is driven to close for blocking said fluid flowing through said valve unit, wherein in said opened position, said fluid inlet in driven to open for allowing said fluid flowing through said fluid inlet and said fluid outlet at said predetermined flow rate;

a power unit, which comprises a motor and a driving pin rotatably extended from said motor for delivering a rotational power;

a cam which comprises a cam body rotatably mounted between said power unit and said valve unit, in such a manner that said power unit is arrange to drive said cam body to rotate for driving said valve unit moving between said closed position and said opened position, wherein said cam is adapted to produce a valve signal showing a corresponding position of said valve unit; and a valve safety arrangement, which comprises two fingers, which are spacedly apart from each other to define a driving slot between said two fingers, upwardly extended from said cam body, wherein said driving pin of said motor is extended to receive in said driving slot for normally driving said cam body to rotate so as to drive said valve unit to move between said closed position and said opened position, wherein when said valve unit is stuck in said tube, said driving pin is arranged to break said fingers for mechanically disconnecting said power unit with said cam body, so as to allow a correct valve signal being shown for truly reflecting a position of said valve unit in said tube.

* * * * *